(12) United States Patent
Puga Pedregosa et al.

(10) Patent No.: US 12,140,288 B2
(45) Date of Patent: Nov. 12, 2024

(54) LIGHT GUIDE FOR A VEHICLE

(71) Applicant: VALEO VISION, Bobigny (FR)

(72) Inventors: Lucia Puga Pedregosa, Bobigny (FR); Maria Victoria Sanchez Martinez, Bobigny (FR); Maria Del Carmen Montano Segura, Bobigny (FR); Juan Manuel Martinez Spinola, Bobigny (FR)

(73) Assignee: VALEO VISION, Bobigny (FR)

( * ) Notice: Subject to any disclaimer, the term of this patent is extended or adjusted under 35 U.S.C. 154(b) by 0 days.

(21) Appl. No.: 18/552,728

(22) PCT Filed: Mar. 31, 2022

(86) PCT No.: PCT/EP2022/058631
§ 371 (c)(1),
(2) Date: Sep. 27, 2023

(87) PCT Pub. No.: WO2022/207827
PCT Pub. Date: Oct. 6, 2022

(65) Prior Publication Data
US 2024/0159373 A1 May 16, 2024

(30) Foreign Application Priority Data
Apr. 1, 2021 (FR) ...................... 2103419

(51) Int. Cl.
*F21S 43/237* (2018.01)
*F21S 43/14* (2018.01)
*F21S 43/245* (2018.01)
(52) U.S. Cl.
CPC ............. *F21S 43/237* (2018.01); *F21S 43/14* (2018.01); *F21S 43/245* (2018.01)

(58) Field of Classification Search
CPC ..... G02B 6/0006; G02B 6/001; F21S 43/237; F21S 43/245
See application file for complete search history.

(56) References Cited

U.S. PATENT DOCUMENTS

2007/0297189 A1\* 12/2007 Wu ........................ G02B 6/001
362/555
2011/0292660 A1 12/2011 Eichelberger
(Continued)

FOREIGN PATENT DOCUMENTS

DE          101 62 105 A1    7/2003
DE    10 2012 213 845 A1    2/2014
(Continued)

OTHER PUBLICATIONS

International Search Report mailed on Jul. 7, 2022 in PCT/EP2022/058631 filed on Mar. 31, 2022 (5 pages).
(Continued)

*Primary Examiner* — Eric T Eide
(74) *Attorney, Agent, or Firm* — Oblon, McClelland, Maier & Neustadt, L.L.P.

(57) ABSTRACT

A light guide designed to be mounted in a vehicle includes a coupling portion presenting an input face, a main portion adjacent to said coupling portion, and a light output surface extending at least along the main portion. The light guide is arranged in such a way that light rays that enter into the light guide through the input face are propagated by total internal reflection along the coupling portion and then along the main portion, before reaching out of the light guide trough the output surface. The light input face is flat and has a periphery that is formed by only five edges of substantially the same size, these edges joining together such that they form five angles with substantially the same value.

17 Claims, 3 Drawing Sheets

(56) References Cited

U.S. PATENT DOCUMENTS

| | | | |
|---|---|---|---|
| 2012/0250345 A1 | 10/2012 | Peron et al. | |
| 2014/0078765 A1* | 3/2014 | Bungenstock | F21S 43/14 362/511 |
| 2015/0167913 A1 | 6/2015 | Stefanov et al. | |
| 2017/0030546 A1* | 2/2017 | Koshiro | F21S 43/14 |
| 2017/0356615 A1* | 12/2017 | Min | G02B 6/0006 |
| 2018/0017227 A1* | 1/2018 | Greene | G02B 6/001 |
| 2018/0284335 A1* | 10/2018 | Godbillon | G02B 6/0045 |
| 2018/0306956 A1* | 10/2018 | Ni | F21S 43/245 |
| 2019/0072708 A1* | 3/2019 | Liu | G02B 6/0068 |

FOREIGN PATENT DOCUMENTS

| | | |
|---|---|---|
| EP | 2 775 197 A1 | 9/2014 |
| FR | 2 953 276 A1 | 6/2011 |
| FR | 2 970 319 A1 | 7/2012 |

OTHER PUBLICATIONS

Preliminary French Search Report dated Nov. 10, 2021 in French Application 2103419 filed on Apr. 1, 2021 (10 pages, with Translation of Categories).

\* cited by examiner

[Fig. 1]
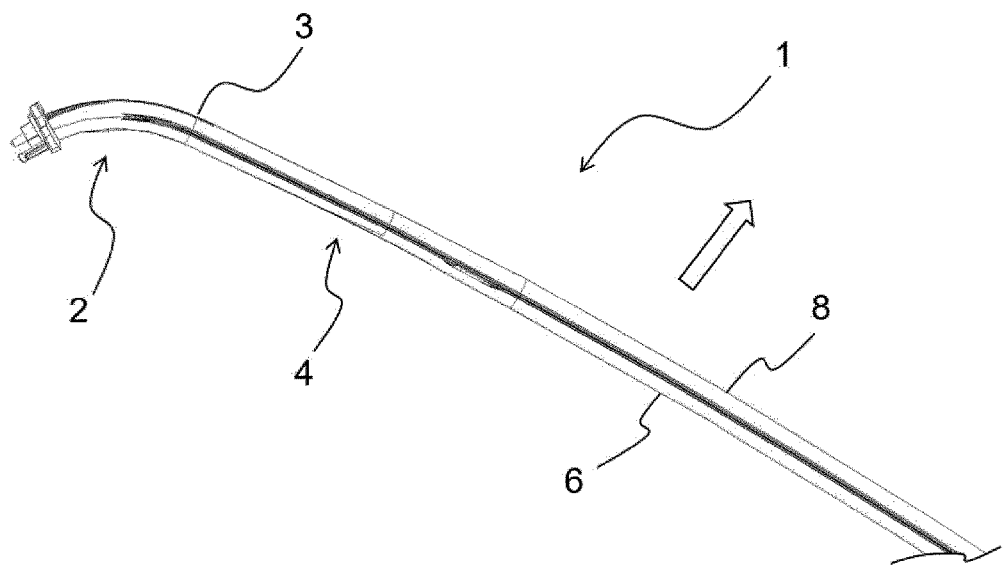
[Fig. 2]
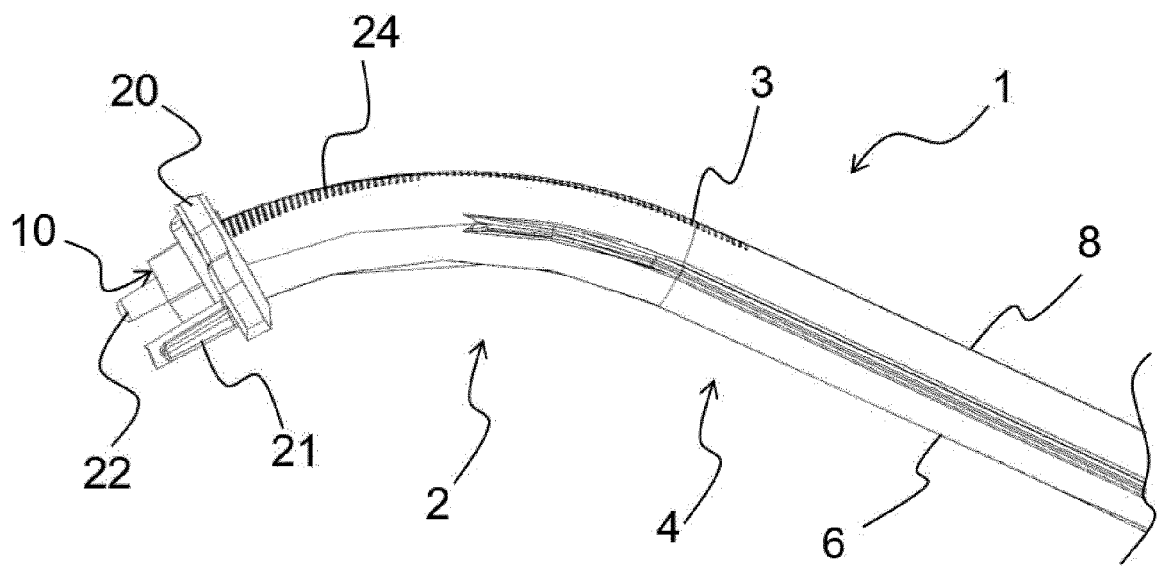

[Fig. 3]
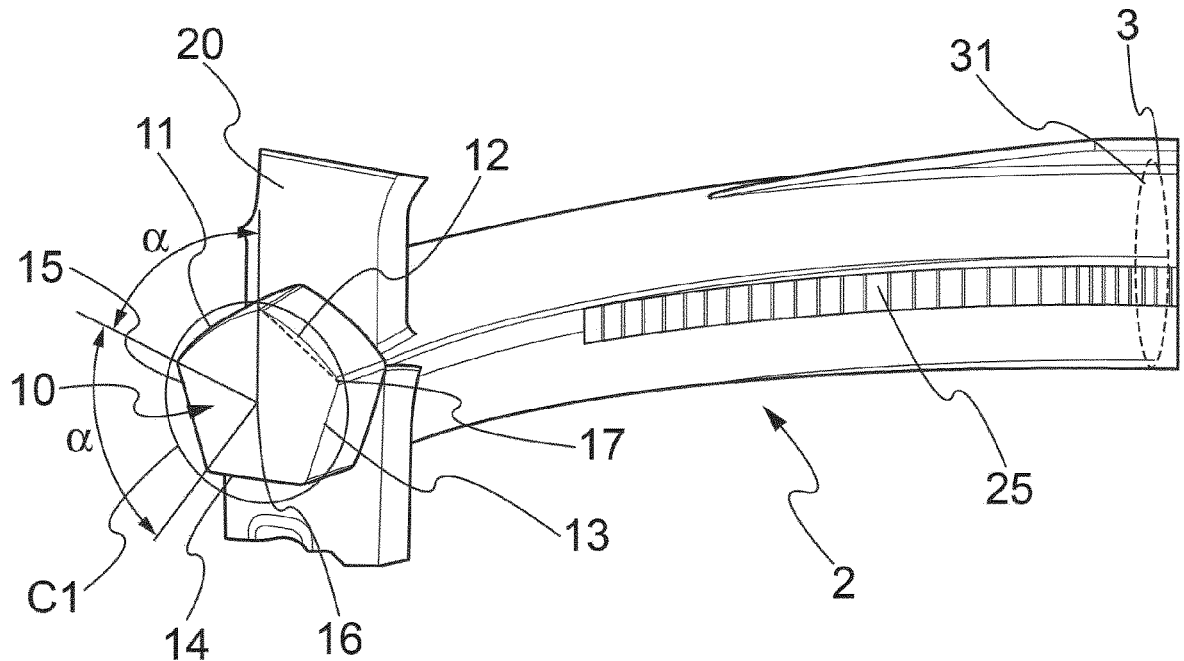
[Fig. 4]
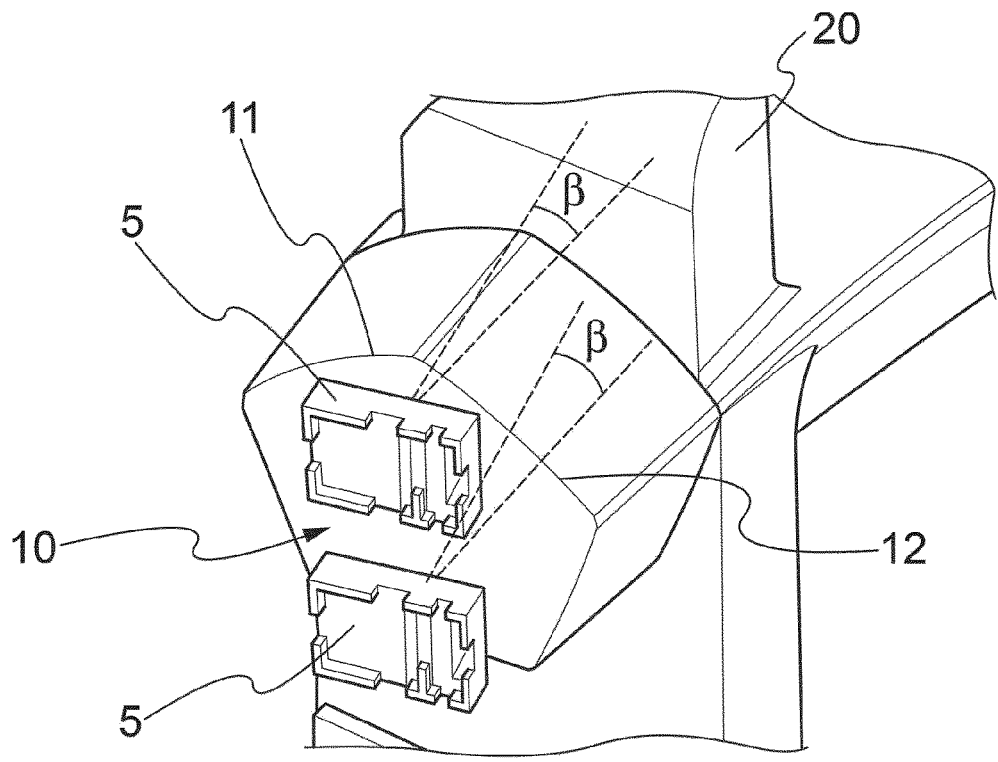

[Fig. 5]
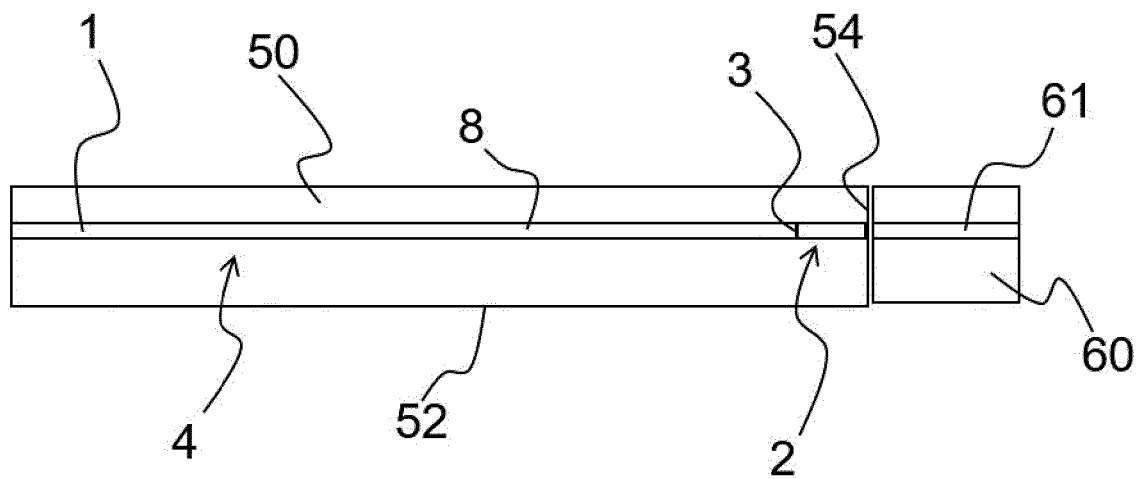

LIGHT GUIDE FOR A VEHICLE

The present invention relates to the field of automotive vehicles and particularly relates to a light guide for vehicles, notably automotive vehicles.

It is well known to use a light guide for achieving a lighting and/or signaling function of an automobile. The light guide is a transparent or translucent part within which light rays propagate in a controlled manner from one end of the guide, called entry face, to the other end, called exit face. Near the entry face, there are one or more light sources, for example, Light Emitting Diodes (LEDs) are provided. The rays of the light emitted by the light source travel by several total internal reflections along the length of the light guide toward the exit face.

Some light guides are designed in such a way that their light coupling portion is highly bended compared to an adjacent main portion. In such a case, notably in the case of a circular section light guide, the lighting surface of the guide will not appear as homogeneous, as the light will be not out coupled uniformly along the light guide, especially in the coupling zone.

One objective of the present invention is to provide a light guide with a better homogeneity of its illuminating surface, notably when the light guide is more curved near its light input surface.

The present invention provides a light guide configured to be mounted in a vehicle, said light guide comprising:
 a coupling portion presenting an input face,
 a main portion extending from said coupling portion,
 an output surface extending at least along the main portion,
the light guide being arranged in such a way that light rays that enter into the light guide through the input face are propagated by total internal reflection along the coupling portion and then along the main portion, before reaching out of the light guide trough the output surface,
wherein the input face is flat and has a periphery that is formed by only five edges of substantially the same size, these edges joining together such that they form five angles with substantially the same value.

In other words the input face has a pentagonal or pentagonal-like shape. In this application the terms "pentagonal-like shape" encompass shapes that are globally a pentagon but that would differ with small differences, for example a Reuleaux polygon with five sides.

The applicant discovered that surprisingly with a light guide light input face having a pentagonal shape or with a pentagonal-like shape, the homogeneity and the luminance in a curved coupling portion of a light guide was highly improved, more particularly where the curved coupling portion joins the less curved portion of this light guide, compared to an input face with a circular shape.

They noted that the pentagonal shape is better to increase the rebound of the light inside of the guide and to mix better the light, the result is a smaller dark area in comparison with the initial dark area, and therefore a better homogeneity.

More particularly, this will enable to arrange the light source(s) near the wall of a housing of a lighting or signaling device of a vehicle, which would include this light guide. For example, it would be possible to have a stripe of light running closer to this wall, while keeping homogeneity. For example, the light guide would be particularly useful in a signaling device arranged in a vehicle trunk and adjacent with the tail lamp of the fender of this vehicle, especially with this tail lamp including also a signaling device generating a stripe of light in continuity with the stripe of light generated in this case by the light guide.

In this text the words "front" and "behind" are to be understood in respect of the direction the light is going out of the light guide.

Also the term "vehicle" designates any kind of vehicle such as a car or a motorized bike but also other motorized vehicle, having a human driver, being remotely controlled or being autonomous. It also designates such vehicles with no motor, for example but not imitatively bikes with no motors.

The light guide of the present invention can also comprise one or any combination of several of the following features:
 at least one of the edges is a convex edge; the applicant discovered that surprisingly instead of having a perfect pentagon, the results were improved when having at least one edge with a convex curvature;
 the convex edge or at least one of the convex edges is an arc of circle; this enables a better result and also a better control of the light guide design;
 there is two adjacent convex edges and three straight edges; this can provide optimized results;
 said light guide presents a joining section, where the main portion extends from the coupling portion, the main portion being of circular section and the joining section being circular; the shape of the input face provides good results with a main portion designed this way;
 the input face presents a five sided shape and the coupling portion presents a continuous evolution from the five sided shape of the input face to the joining section; this enables an improved mixing of the light all along the coupling portion;
 each of the five angles formed by the five edges presents a vertices, the five corresponding vertices being positioned on a circumscribed circle, which has the same diameter as the joining section; better homogeneity is obtained;
 said light guide further comprises a mounting portion, which comprises mounting organs to mount the light guide on a support, said mounting portion extending from the coupling portion; this enables a better accuracy when mounting the light guide;
 the mounting portion extends from the coupling portion at a mounting position on this coupling portion, said mounting position being distant from the input face and from the main portion;
 the light guide according to any of the preceding claims, wherein the coupling portion presents a curvature with a radius equal to four times or more than four times the diameter of the main portion;
 the input face is oriented vertically.

The invention also relates to a luminous device designed to be mounted on a vehicle and comprising a light guide according to the invention and at least one light source emitting light toward the input face in such a way that this light propagates along the light guide and goes out of the output face.

The luminous device can be, but is not limited to, a headlamp or a rear lamp, notably a rear lamp mounted in a trunk or in a fender of a car.

The luminous device of the present invention can also comprise one or any combination of several of the following features:
 said light source presents a light emission axis which is forming an incident angle with the normal to the input face inferior or equal to 10 degrees; the invention enables freedom of positioning of the light source;

the light source or each of the light sources includes one or more Light Emitting Diodes; Light Emitting Diodes, hereafter LEDs, are particularly adapted to this invention;

the light source(s) and the light guide are arranged such that the light guide emits a signaling function;

the luminous device comprises a housing having:
a front exit face, from which the light is emitted out of the luminous device,
a side wall, the input face of said light guide being close to the side wall, said coupling portion first extending along said side wall and then being curved such that it extends away from this side wall and up to the front exit face, said main portion running along said front exit face.

The invention also relates to a system of two luminous devices, at least one being according to the invention, wherein the side walls of the two luminous devices being adjacent or in contact together, in such a way that the front exiting face of the two luminous devices are adjacent or in contact and that their corresponding light guides form a single lit line together, when the light source(s) is(are) lit on.

The invention also relates to a vehicle comprising a luminous device according to the invention or a system according to the invention.

To complete the description and to provide a better understanding of the invention, a set of drawings is provided. Said drawings form an integral part of the description and illustrate an embodiment of the invention, which should not be construed as restricting the scope of the invention, but only as an example of how the invention can be carried out. The drawings comprise the following characteristics.

FIG. 1 shows a top view of a light guide according to an embodiment of the present invention.

FIG. 2 is an enlarged view of FIG. 1.

FIG. 3 shows a perspective view of the coupling portion of the light guide of FIG. 1.

FIG. 4 shows an enlarged view of FIG. 3 with two light sources.

FIG. 5 shows a system of lighting devices according to the invention.

The following description of examples of embodiments with reference to the drawings is intended to explain the general inventive concept of the present application, instead of limiting to the present invention.

FIGS. 1 and 2 show light guide 1 according to an embodiment of the present invention. For example, the light guide 1 may be used in a vehicle lamp of an automotive vehicle. In particular, the light guide 1 may be used in a rear lamp of an automotive vehicle.

Referring to FIGS. 1 to 4, the light guide 1 comprises:
a coupling portion 2 presenting an input face,
a main portion 4 extending from said coupling portion,
an output surface 8 extending at least along the main portion,
the light guide 1 being arranged in such a way that light rays that enter into the light guide through the input face 10 are propagated by total internal reflection along the coupling portion 2 and then along the main portion 4, before reaching out of the light guide through the output surface 8,
wherein the said input face is flat and has a periphery that is formed by only five edges, 11 to 15, of substantially the same size, these edges joining together such that they form five angles α with substantially the same value.

The light guide 1 is here made of transparent material such as polycarbonate. Other materials may be used for example polymethyl methacryalate (PMMA) or other suitable transparent polymers.

According to the invention and as in this example, the light guide 1 can comprise decoupling elements 24, 25 along its length, in order to decouple light from the light guide 1 out of its output surface 8. Here the decoupling elements are provided along both the coupling portion 2 and the main portion 4. Therefore here, the output face extends along the coupling portion 2 and the main portion 4.

Here first decoupling elements 24 are arranged on the front of the light guide 1 and decouples light via refraction, and second decoupling elements 25 are arranged at the rear of the light guide 1 and decouples light via reflection towards the output face 8.

FIG. 4 shows two light sources 5, here LEDs, arranged such that they face and lit the input face 10.

As can be better seen on FIGS. 3 and 4, the input face is a pentagonal-like shape as its five angles α have the same value of 72 degrees and the five edges 11 to 15 are approximatively of the same length. Also, three of the edges 13, 14, 15, here the lower edges, are straight edges. However, the two upper edges 11, 12, are here presenting a convex curvature which is an arc of circle. On FIG. 3 a straight dotted line has been represented to show the curvature of the edge 12 located above this dotted line.

On FIG. 3 is also represented a doted circle which represents the joining section 3 delimiting the main portion 4 from the coupling portion 2.

The joining section 3 is here circular. The main portion 4 extends from the joining section 3, such that it is arranged as a rod having a circular section, here constant, i.e. equal to the joining section 3 diameter.

As can be seen on FIG. 3, the coupling portion 2 has a continuous evolution from the five sided shape of the input face 10 to the joining section 3. In other words, the shape of the coupling portion has a continuous transition from a pentagonal-like section to a circular section.

Each of the five angles α formed by the five edges 11 to 15 presents a vertices 17. As in a pure pentagon, the five corresponding vertices 17 are positioned on a circumscribed circle C1, which has the same diameter as the joining section 3.

Here the coupling portion also comprises a mounting portion 20, which comprises mounting organs 21, 22 to mount the light guide 1 on a support. These mounting organs 21, 22 can be made integrally in one part with the mounting portion.

These mounting organs 21, 22, can be but are not limited to position means, clipping means, or holes for receiving clipping means.

Here, said mounting portion 20 extends from the top and from the bottom of the coupling portion 2 at a coupling position and is integrally formed with it.

The mounting portion 20 can for example be mounted on a bezel, a bracket, and/or a housing (not shown in the Figures) of a luminous device of a vehicle.

According to the invention and as in this example, the mounting position can be distant from the input face 10 and from the joining section 3, this mounting position being arranged closer to the input face 10, so that, as it can be seen on FIGS. 3 and 4, the coupling section presents a shape with five distinct faces from the input face 10 to the mounting portion 20. Notably, the coupling portion 2 has globally a pentagonal-like shape section all along its length from the input face 10 to the mounting portion 20.

The five distinct faces can present a demolding angle inferior or equal to 2 degrees to eject the part from the mold.

As can be seen on FIG. 1, the coupling portion 2 presents a curvature with a radius equal to four times or more than four times the diameter of the main portion 4.

In FIG. 4, schematically represents the LEDs light emission axis, which is forming an incident angle β with the normal to the input face 10. On FIG. 4, for each angle β represented, the said normal is the right dotted line and the light emission axis is the left dotted line. This incident angle β is inferior or equal to 10 degrees.

FIG. 5 is a schematic diagram of a system of two luminous devices 50, 60, according to embodiments of the invention. These devices 50, 60 are arranged at a rear end portion of an automotive vehicle, each with a light guide 1, 61 of the present invention.

The first luminous device 50 is here a signaling device arranged in a vehicle trunk and adjacent with the second luminous device 60, here a tail lamp of a rear fender of the vehicle.

Each of these luminous devices 50, 60, comprises a housing 52, which comprises:
- a front exit face, not referenced, which is here an outer lens through which the respective light guides 1, 61 are visible,
- a side wall 54, the input face 10 of the corresponding light guides 1, 61 being close to the corresponding side wall 54.

Here, in each cases the coupling portion 2 first extends along said side wall 54 and then is curved such that it extends away from this side wall 54 and up to the front exit face, said main portion 4 running along said front exit face.

The respective light guides 1, 61 of the first and second luminous devices 50, 60 are here particularly useful, as the light guide 1 is generating a stripe of light in continuity with the stripe of light generated by the light guide 61 of the second luminous device 60. As can be seen from the FIG. 5, the second luminous device 60 can emit a continuous strip of light through the output surface 8 of the light guide 1 of the first luminous device 50 and the output face of the light guide 61 of the second luminous device 60.

The light guide 1 of the present invention will enable to arrange the LEDs 5 near the side wall 54 of the housing 52. It would be possible to have a stripe of light running closer to this side wall 54, which will enhance the stripe continuous effect above mentioned, while keeping homogeneity.

The person skilled in the art realizes that the present invention by no means is limited to the preferred embodiments described above. On the contrary, many modifications and variations are possible within the scope of the appended claims. Also, the skilled person readily realizes that the different embodiments described herein may be combined freely to obtain new combinations.

The invention claimed is:

1. A light guide configured to be mounted in a vehicle, said light guide comprising:
    a coupling portion presenting an input face,
    a main portion extending from said coupling portion, the main portion being arranged as a rod presenting a circular cross-section,
    a joining section delimiting the main portion from the coupling portion, the joining portion presenting a circular cross-section having a diameter equal to a diameter of the main portion, and
    an output surface extending along the coupling portion and the main portion,
    the light guide being arranged in such a way that light rays that enter into the light guide through the input face are propagated by total internal reflection along the coupling portion and then along the main portion, before reaching out of the light guide through the output surface,
    wherein the input face is flat and has a periphery that is formed by only five edges being substantially equal, the edges joining together such that the edges form five angles being substantially equal so as to present a pentagonal shape, and
    wherein the coupling portion presents a continuous evolution from the pentagonal shape of the input face to the joining section presenting the circular cross-section.

2. The light guide according to claim 1, wherein at least one of the edges is a convex edge.

3. The light guide according to claim 2, wherein the convex edge or at least one of the convex edges is an arc of circle.

4. The light guide according to claim 2, wherein there is two adjacent convex edges and three straight edges.

5. The light guide according to claim 1, wherein each of the five angles formed by the five edges presents a vertex, the five vertices being positioned on a circumscribed circle having a same diameter as the joining section.

6. The light guide according to claim 1, further comprising a mounting portion, which comprises mounting organs to mount the light guide on a support, said mounting portion extending from the coupling portion.

7. The light guide according claim 6, wherein the mounting portion extends from the coupling portion at a mounting position on the coupling portion, said mounting position being distant from the input face and from the main portion.

8. The light guide according to claim 1, wherein the coupling portion presents a curvature with a radius equal to at least four times the diameter of the main portion.

9. A luminous device designed to be mounted on a vehicle and comprising:
    a light guide according to claim 1; and
    a light source emitting light toward the input face in such a way that the light propagates along the light guide and goes out of the output face.

10. The luminous device according to claim 9, wherein said light source presents a light emission axis which is forming an incident angle with the normal to the input face inferior or equal to 10 degrees.

11. The luminous device according to claim 9, wherein the light source includes one or more Light Emitting Diodes.

12. The luminous device according to claim 9, wherein the light source and the light guide are arranged such that the light guide emits a signaling function.

13. The luminous device according to claim 9, comprising a housing having:
    a front exit face, from which the light is emitted out of the luminous device,
    a side wall, the input face of said light guide being close to the side wall,
    said coupling portion first extending along said side wall and then being curved such that it extends away from this side wall and up to the front exit face, said main portion running along said front exit face.

14. The light guide according to claim 3, wherein there is two adjacent convex edges and three straight edges.

15. The light guide according to claim 2, wherein said light guide presents a joining section, where the main portion extends from the coupling portion, the main portion being of circular section and the joining section being circular.

16. The light guide according to claim 2, further comprising a mounting portion, which comprises mounting organs to mount the light guide on a support, said mounting portion extending from the coupling portion.

17. A light guide configured to be mounted in a vehicle, said light guide comprising:
- a coupling portion presenting an input face,
- a main portion extending from said coupling portion,
- an output surface extending at least along the main portion,
- the light guide being arranged in such a way that light rays that enter into the light guide through the input face are propagated by total internal reflection along the coupling portion and then along the main portion, before reaching out of the light guide through the output surface,
- wherein the input face is flat and has a periphery that is formed by only five edges being substantially equal, the edges joining together such that the edges form five angles being substantially equal, and
- wherein at least one of the edges is a convex edge.

* * * * *